(12) United States Patent
Kwon et al.

(10) Patent No.: US 9,776,790 B2
(45) Date of Patent: Oct. 3, 2017

(54) HEIGHT EXTENSIBLE CONTAINER-TYPE WAREHOUSE

(71) Applicant: Yeong-Jong Kwon, Chungcheongbuk-do (KR)

(72) Inventors: Yeong-Jong Kwon, Chungcheongbuk-do (KR); Jong-Seok Lee, Chungcheongbuk-do (KR); Seung-Won Shim, Daejeon (KR)

(73) Assignee: YEONG-JONG KWON, Chungcheongbuk-do (KR)

( * ) Notice: Subject to any disclaimer, the term of this patent is extended or adjusted under 35 U.S.C. 154(b) by 0 days.

(21) Appl. No.: 15/112,777

(22) PCT Filed: Jan. 14, 2015

(86) PCT No.: PCT/KR2015/000359
§ 371 (c)(1),
(2) Date: Jul. 20, 2016

(87) PCT Pub. No.: WO2015/108322
PCT Pub. Date: Jul. 23, 2015

(65) Prior Publication Data
US 2016/0332812 A1 Nov. 17, 2016

(30) Foreign Application Priority Data
Jan. 20, 2014 (KR) .................. 10-2014-0006696

(51) Int. Cl.
*B65D 88/00* (2006.01)
*B65D 90/00* (2006.01)
*B65G 1/02* (2006.01)
*B65G 1/04* (2006.01)

(52) U.S. Cl.
CPC ....... *B65D 90/0073* (2013.01); *B65D 88/005* (2013.01); *B65D 90/0053* (2013.01); *B65G 1/02* (2013.01); *B65G 1/04* (2013.01)

(58) Field of Classification Search
CPC ........ B65G 1/04; B65G 1/02; B65D 90/0053; B65D 90/0073
USPC .................... 414/276; 52/79.3, 66
See application file for complete search history.

(56) References Cited

U.S. PATENT DOCUMENTS

| | | | | |
|---|---|---|---|---|
| 3,883,002 A | * | 5/1975 | Moore ............... | B62H 3/08 211/18 |
| 5,778,604 A | * | 7/1998 | Snow ............... | E04H 1/1205 220/264 |
| 6,637,602 B2 | * | 10/2003 | Dueck ............... | B62H 3/12 211/17 |
| 7,481,027 B2 | * | 1/2009 | Blume ............... | B62H 3/04 211/17 |
| 7,784,622 B2 | * | 8/2010 | Bernard ............... | B62H 3/08 211/20 |

(Continued)

FOREIGN PATENT DOCUMENTS

JP 2004027715 A * 1/2004

*Primary Examiner* — Kaitlin Joerger
(74) *Attorney, Agent, or Firm* — Dentons US LLP (57) ABSTRACT

The present invention relates to a height-extensible container-type warehouse that is manufactured in a container type at a factory, can be transported to a desired place, and can be increased in height at the place by coupling a section, which exceeds a height limit under the Road Traffic Act and is separately manufactured, to an opening of the warehouse in order to increase the height thereof.

3 Claims, 14 Drawing Sheets

(56) References Cited

U.S. PATENT DOCUMENTS

| | | | | |
|---|---|---|---|---|
| 7,946,432 B1* | 5/2011 | Swanson | ............... | B62H 3/08 |
| | | | | 211/20 |
| 8,950,592 B1* | 2/2015 | Greenblatt | ............ | B62H 3/08 |
| | | | | 211/17 |
| 8,991,105 B2* | 3/2015 | Harvey | ............. | E04B 1/3445 |
| | | | | 52/66 |
| 2016/0333601 A1* | 11/2016 | Kwon | ................. | E04H 6/005 |

* cited by examiner

HEIGHT EXTENSIBLE CONTAINER-TYPE WAREHOUSE

CROSS-REFERENCE TO RELATED APPLICATIONS

The present application is the 371 National Stage of PCT International Application No. PCT/KR15/00359 filed 14 Jan. 2015, which claims the benefit of priority to Korea Application No. 10-2014-0006696 filed 20 Jan. 2014.

TECHNICAL FIELD

The present invention relates to a height-extensible container-type warehouse whereby a new technology of simply increasing a height thereof by separately manufacturing a section exceeding a height limit under the Road Traffic Act, transporting the section to a desired place, and then assembling the section at the desired place in order to use a warehouse manufactured in the shape of a container at the desired place.

BACKGROUND ART

In general, a warehouse means a storehouse for temporary or long-term keeping of articles for daily life, such as food, beverages, clothes, appliances, sundry goods, and industrial products that are manufactured in large quantities at factories in producing districts.

That is, a warehouse is used for temporary or long-term keeping of various articles manufactured in large quantities at factories and is composed of various management parts for not only simply managing articles, but quickly handling articles such as arrangement of articles or storage/delivery control and inventory control, and efficiently managing loading spaces.

With the rapid development of the delivery industry, warehouses are used for creating new businesses such as arranging articles in stock in the warehouses and inventory control for efficient storage and delivery, including management of articles, so warehouses are designed and constructed to be able to handle a large amount of articles by more efficiently using the spaces for keeping articles in addition to quick storage and delivery of articles manufactured in large quantities.

Further, warehouses are generally designed and operated in a one-to-one type by keeping articles using a stacker crane for storing articles on loading racks in which a plurality of cells is formed with predetermined standards and delivering articles.

An automated warehouse system is composed of a control unit that manages data and controls facilities, loading racks for keeping articles in each cell, and a stacker crane for storing and taking articles in and out of the loading racks, and can keep raw materials, half-finished goods, and finished products in the general industries.

In the automated warehouse system, a passage section having a predetermined size through which a transport can pass is formed by sequentially arranging posts or load beams and tie beams in a loading rack structure so that a stacker crane loads articles in each cell of loading racks or moving articles in the cells to desired places while moving through the passage section.

As a warehouse, an 'automated warehouse' has been disclosed in the related art in Korean Patent No. 10-0843308.

This automated warehouse is characterized by having a simple double-post structure having two posts arranged in a width direction, being able to ensure structural stability, and being able to stably and efficiently keep long freight, particularly, steel materials including H-beams, steel pipes, steel plates, thick plates for ships, or containers for sea transportation by reducing the distance between braces disposed at the center in the width direction of racks.

However, all warehouses of the related art including this warehouse are considered as buildings that should be constructed at desired places, so they cannot be moved.

That is, the warehouses in the related art are buildings constructed at predetermined places, so they are used only at those places.

DISCLOSURE

Technical Problem

In order to solve the problems of warehouses in the related art, an object of the present invention is to make a movable container into a warehouse so that the movable container can be efficiently manufactured at factories and can be moved and used at desired places.

Accordingly, an object of the present invention is to load articles having a length of 1.5 m or more (for example, a bicycle of 1.8 m) in a container of 3 m, which is a limit under the Road Traffic Act, in order to keep more articles, and load those articles in two floors in order to increase loading efficiency.

Further, an object of the present invention is to transport a warehouse without exceeding a height limit of 4 m (including the height of a vehicle) under the Road Traffic Act.

Technical Solution

In order to solve the problems, the present invention provides a technology of making a container as a warehouse, installing a plurality of loading racks with a predetermined gap in a longitudinal direction in the warehouse, and seating an automated stacker unit, which loads and unloads articles by moving along moving rails, on a conveying line disposed ahead of the loading racks.

Further, the present invention provides a technology of handling articles in a container having a width of 3 m or less by moving and keeping articles having a length of 1.5 m or more at an angle.

Further, the present invention provides a technology of separately manufacturing a section exceeding a height limit under the Road Traffic Act and integrally combining a height extension cover, which is separately manufactured, after transporting the warehouse to a desired place.

Advantageous Effects

According to the present invention, since a warehouse including loading racks where articles can be loaded on two floors and an automated stacker unit, which can automatically load and unload articles onto and from the loading racks is manufactured in a container type as a finished product at a factory, it is possible to transport the finished warehouse on a truck to a desired place and use the warehouse without specific construction and it is also possible to move the warehouse to another place and install it at the place, whereby it is possible to quickly and conveniently install the warehouse.

Further, according to the present invention, it is possible to completely automatically perform a series of work steps for automatically conveying and vertically moving articles, and loading the articles on desired loading racks on two floors using the automated stacker unit, so it is possible to reduce unnecessary time and manpower and accordingly it is possible to improve operational efficiency and reduce maintenance cost.

Further, according to the present invention, since the warehouse is formed to have a height that does not violate the Road Traffic Act, it is possible to conveniently transport the warehouse to a desired place. Further, since the height extension cover that is separately manufactured is coupled to the opening formed at the top of the warehouse, a sufficient height is simply ensured, so it is possible to improve loading efficiency by loading articles on two floors.

<Description of the Reference Numerals in the Drawings>

| | |
|---|---|
| W: Article | 100: Warehouse |
| 102: Article entrance | 105: Opening |
| 101: Front plate | 104: Rear plate |
| 110: Loading rack | 111: Vertical angle |
| 112: Reinforcing angle | 113: Loading rail |
| 120: Conveying line | 130: Moving rail |
| 150: Height extension cover | 151: Fastener |
| 153: Fastening hole | 200: Frame |
| 202: Vertical post | 204: Moving roller |
| 300: Automated stacker unit | 310: Base plate |
| 311: Front plate | 312: Center plate |
| 313: Motor side-driving shaft | 314: Driving gear |
| 315: Driven shaft | 316: Driven gear |
| 317: Chain | 318: Rear plate |
| 320: Vertical motion motor | 330, 330a: Driving shaft |
| 331, 331a: Driving sprocket | 340: Fixed chain |
| 350: Tray guide rail | 360: Article tray |
| 361: Inclining base | |
| 363: Article support groove | |
| 364: Horizontal portion | 365, 365a: Locking protrusion |
| 366: Inclined portion | 400: Tray driving unit |
| 410: Tray motor | 420: Chain shaft |
| 430: Tray carrying unit | 431: Drawing unit |
| 440: Drawing bar | 450: Anti-chain sagging base |
| 500: Vertical guide unit | 501: Guide roller |
| 502: Roller housing | 503: Housing fastener |

MODE FOR INVENTION

Storage of a bicycle will be described as an example for achieving in detail the technical solution for technical problems of the present invention.

Referring to the accompanying drawings, it can be seen that the entire configuration of the present invention largely includes a warehouse 100, a rectangular frame 200, an automated stacker unit 300, and a tray driving unit 400.

Hereinafter, the present invention will be described in more detail with reference to this schematic configuration to easily achieve the present invention.

First, the warehouse 100 of the present invention can be transported to a desired place without violating the Road Traffic Act and can be immediately used without specific construction at the place by being manufactured as a finished product into a container type at a factory. The warehouse 100 includes loading racks 110 therein to be able to load articles on two floors and an automated stacker unit 300 that can carry articles to desired positions and load and unload articles by moving up and down.

Figure 1:
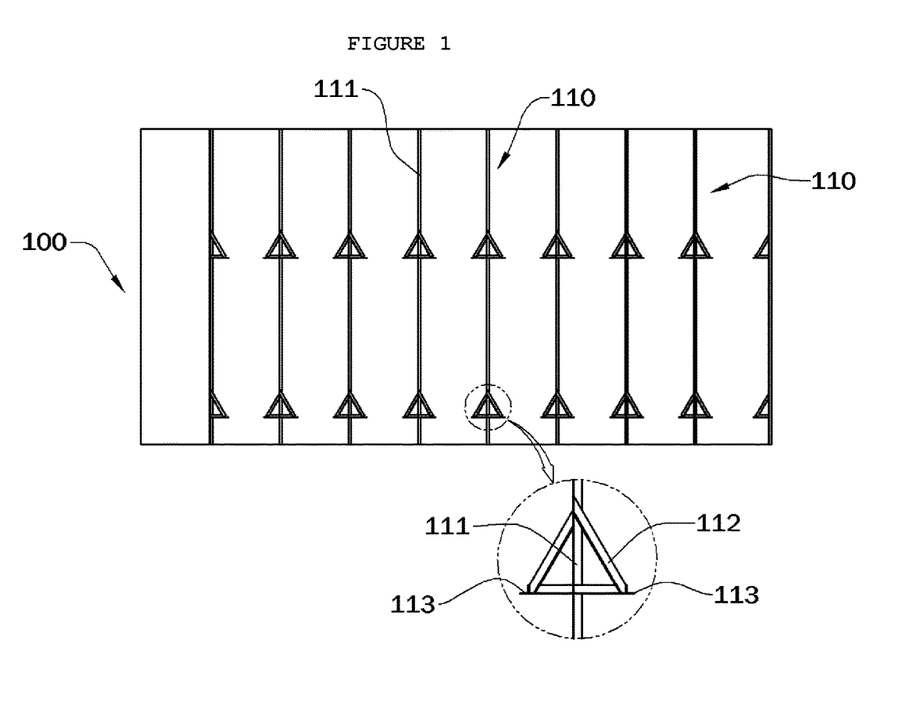
FIG. 1 is a front cross-sectional view of a container-type warehouse to which the present invention is applied.
Figure 2:
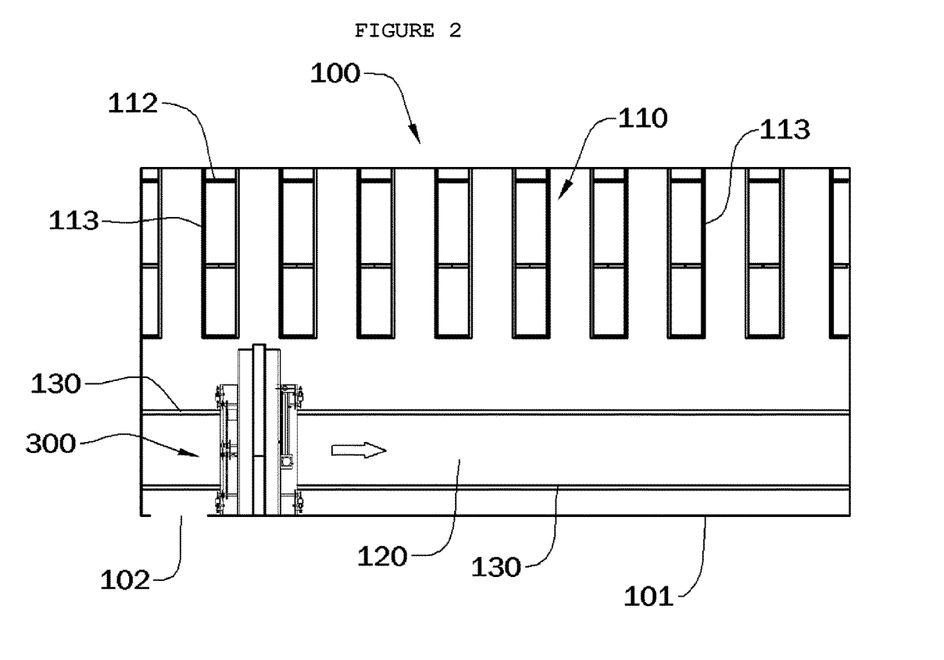
FIG. 2 is a horizontal cross-sectional view of a container-type warehouse of the present invention.
Figure 3:
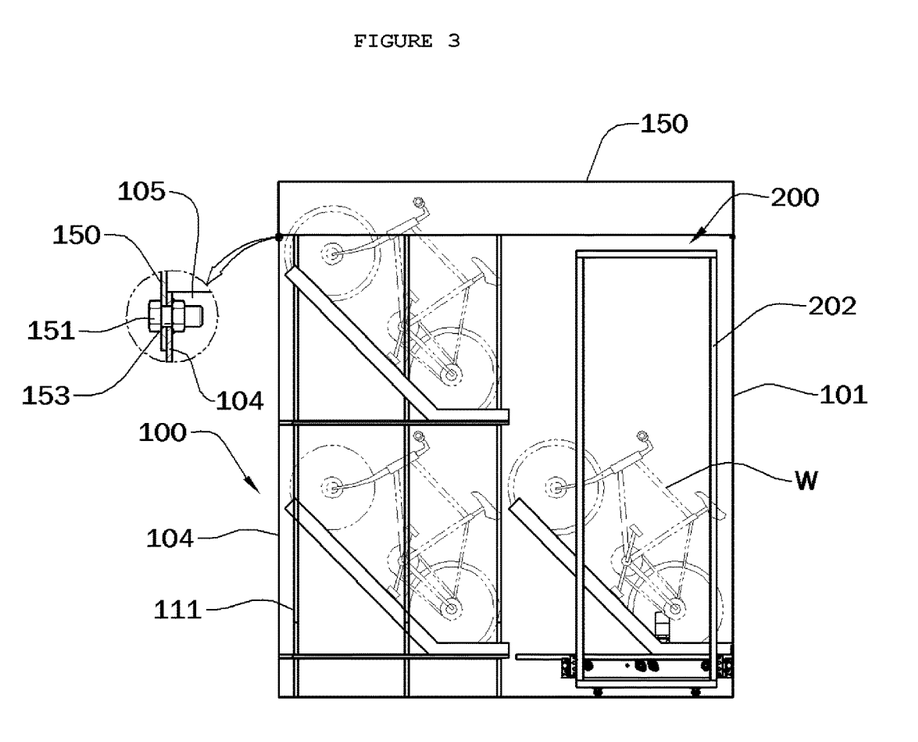
FIG. 3 is a side cross-sectional view of the container-type warehouse of the present invention.
Figure 4:
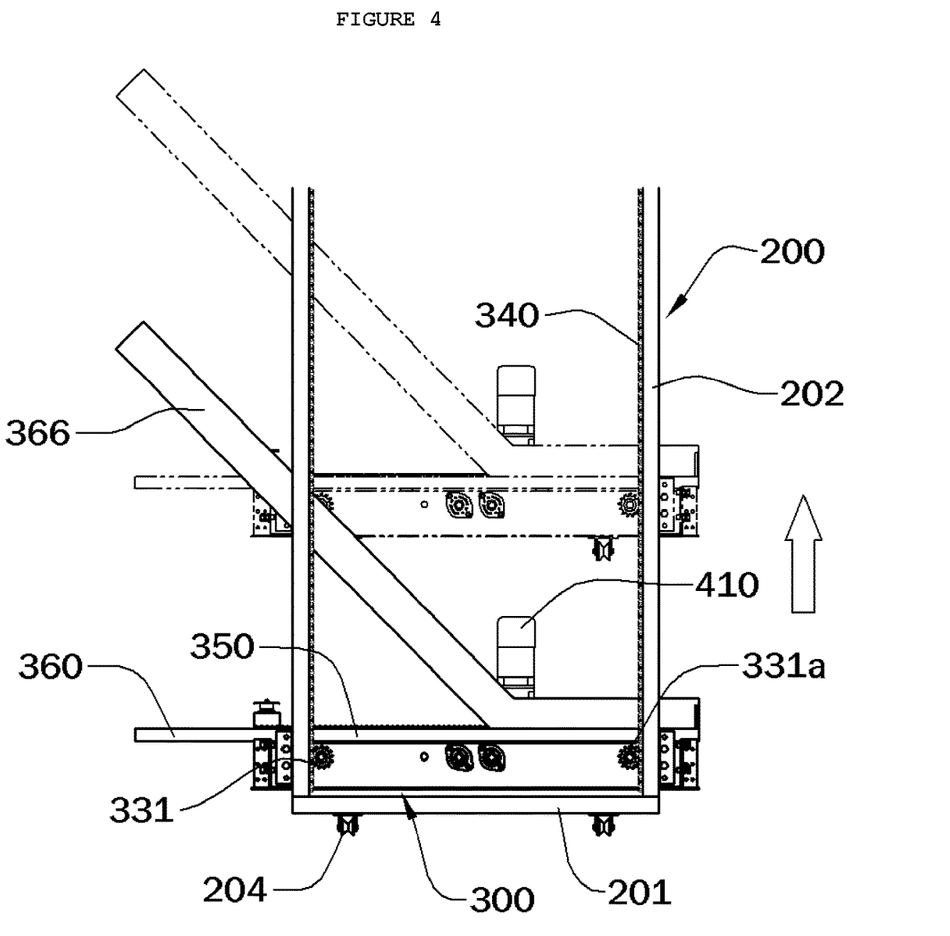
FIG. 4 is a front view showing a state when an automated stacker unit according to the present invention is moved up and down.
Figure 5:
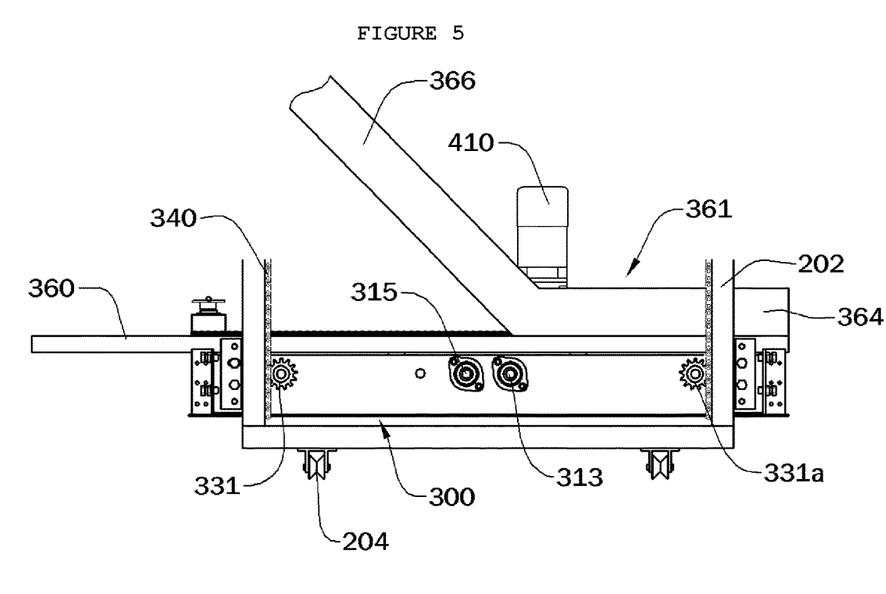
FIG. 5 is a front cross-sectional view of the automated stacker unit of the present invention.
Figure 6:
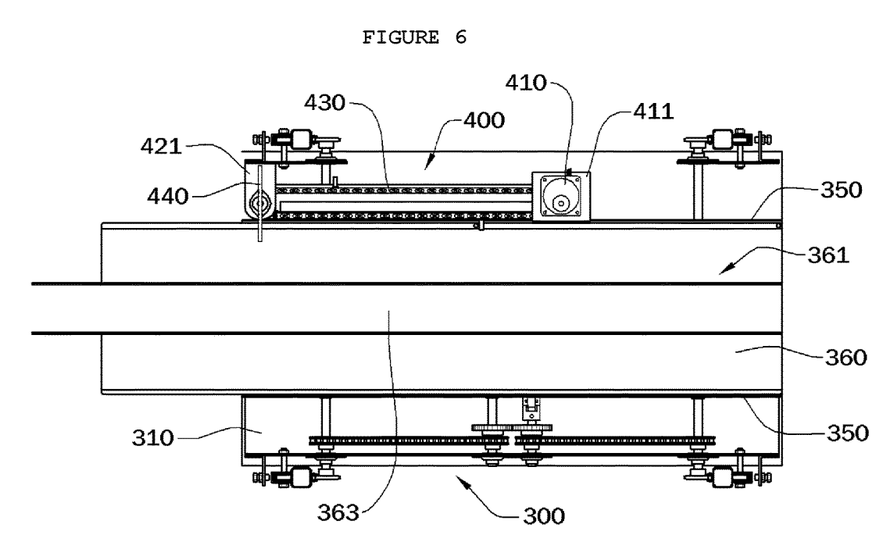
FIG. 6 is a horizontal cross-sectional view of the automated stacker unit of the present invention.
Figure 7:
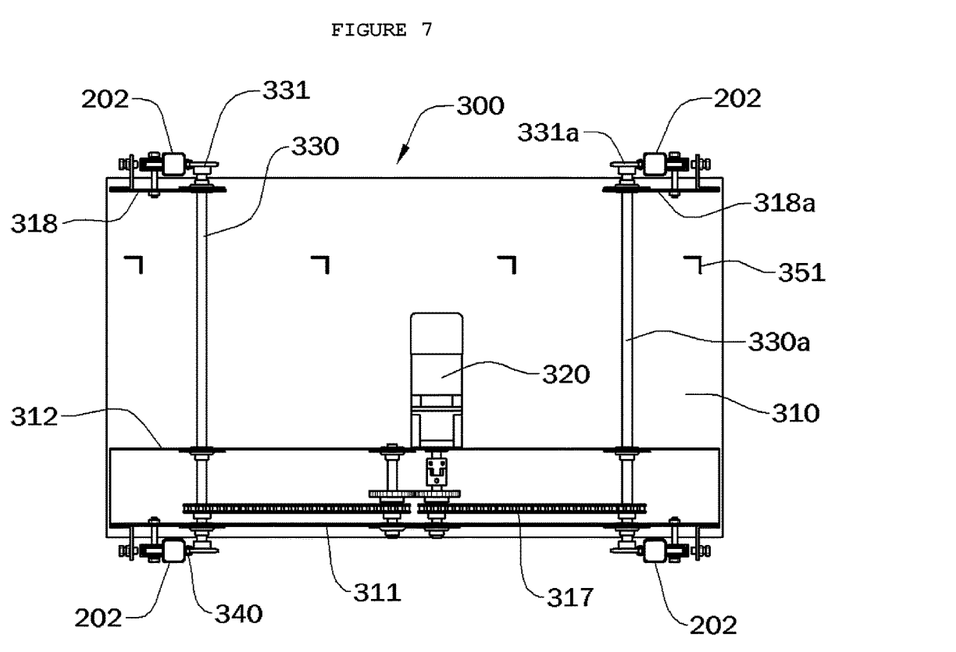
FIG. 7 is a horizontal cross-sectional view of a lifting motor, a driving shaft, and a vertical post of the present invention.
Figure 8:
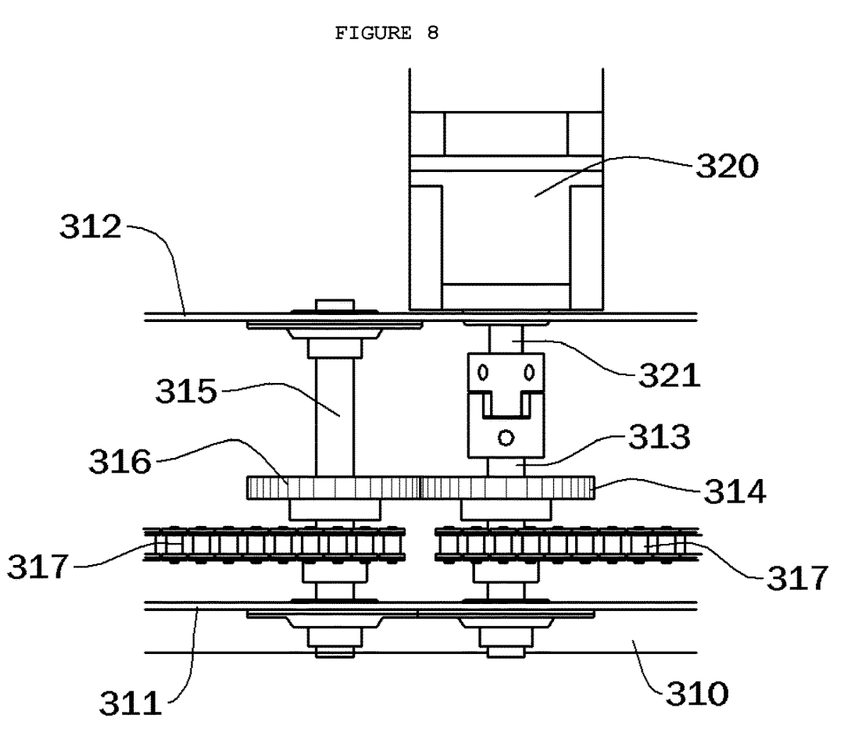
FIG. 8 is a horizontal cross-sectional view showing a power connection state of the lifting motor of the present invention.

In the warehouse 100, as shown in FIGS. 1 to 3, a plurality of loading racks 110 is disposed with regular intervals in a longitudinal direction therein, a pair of moving rails 130 is disposed on a conveying line 120 disposed ahead of the loading racks 110 to move the automated stacker unit 300 to desired positions, an article entrance 102 through which articles W can be freely moved inside and outside is formed at a side of a front plate 101, and an automotive door is installed at the article entrance 102.

The loading racks 110 are arranged in two floors to keep more articles W in the same area, a plurality of vertical angles 111 spaced from each other in a longitudinal direction is arranged with a predetermined gap in a front-rear direction, as shown in FIGS. 2 to 3, triangular reinforcing angles 112 are integrally attached to upper and lower portions of the vertical angles 111, and angle-shaped loading rails 113 where an article tray 360 is mounted are symmetrically integrally connected to both ends of the reinforcing angles 112.

Accordingly, the article tray 360 can be slid on a pair of loading rails 113 respectively between the loading racks 110 and the article tray 360 is integrally attached to the bottom of an anti-bending portion 362, which is seated on the loading rails 113 in sliding and has an anti-friction portion 363 bent at both sides to prevent friction resistance.

The rectangular frame 200 is seated on the moving rails 130 at the conveying line 120 and can freely move along the conveying line 120 on the moving rail 130 using a power source of a well-known X-axial actuator.

The frame 200 makes a rectangular frame by integrally connecting vertical posts 202 to four sides of a pair of rectangular frames 201 vertically spaced from each other, and moving rollers 204 that move on the moving rails 130 are integrally attached to the bottom of the lower rectangular frame 201.

The automated stacker unit 300 that automatically carries articles W to desired positions and loads and unloads articles is disposed inside the frame 200.

The automated stacker unit 300 includes a base plate 310 that is disposed inside the frame 200, a vertical motion motor 320 at the center of the base plate 310, a pair of driving shafts 330 and 330a disposed at both sides of the base plate 310 to rotate in different directions by selective forward/backward operation of the vertical motion motor 320, and driving sprockets 331 and 331a coupled to both ends of the driving shafts 330 and 330a and coupled to a fixed chain 340 attached to inner sides facing each other of the vertical posts 202, so when the vertical motion motor 320 operates forward and backward, the driving sprockets 331 and 331a are selectively vertically moved along the fixed chain 340, so the automated stacker unit 300 can be vertically moved.

Further, a plurality of rail supports 351 is erected in a longitudinal direction ahead of and behind the top of the base plate 310, and a pair of tray guide rails 350 spaced from each other and supporting both sides of the article tray 360 is disposed on the upper ends of the rail supports 351.

Accordingly, the article tray 360 seated on the tray guide rails 350 selectively slides to be inserted between the loading racks 110 or moved over the tray guide rail 350, on the loading rails 113.

The vertical motion motor 320 of the automated stacker unit 300 has a motor shaft 321 integrally connected to a motor side-driving shaft 313 passing through a front plate 311 and a center plate 312 attached to the top of the base plate 310, in which a driving gear 314 on the motor side-driving shaft 313 is in mesh with a driven gear 316 of a driven shaft 315 passing through the front plate 311 and the center plate 312.

The motor side-driving shaft 313 and the driven shaft 315 are connected to the driving shafts 330 and 330a through chains 317, and the driving shafts 330 and 330a pass through the center plate 312 with both ends rotatably passing through the front plate 311 and rear plates 318 and 318a, respectively.

Accordingly, torque from the vertical motion motor 320 is transmitted to the driving shaft 330a through the motor side-driving shaft 313 and the chain 317, and the torque transmitted to the motor side-driving shaft 313 is transmitted to the other driving shaft 330 through the chain 317 and the driven gear 316 engaged with the driving gear 314, so the driving sprockets 331 and 331a are vertically moved along the fixed chain 340, whereby the automated stacker unit 330 can be vertically moved.

While the driving sprockets 331 and 331a are vertically moved along the vertical posts 202, compressive load is applied to the portion where the fixed chain 340 is disposed and accordingly the vertical posts 202 may be bent outward, so vertical guide units 500 are additionally disposed ahead of and behind the base plate 310 to actively prevent this phenomenon.

In the vertical guide units 500, a pair of guide rollers 501 that vertically move along the outer side of the vertical post 202 to which the fixed chain 240 is attached is rotatably disposed respectively at upper and lower portions of a roller housing 502, and housing fasteners 503 disposed through upper and lower portions of the roller housing 502 are integrally attached to the front plate 311 attached to the base plate 310. Accordingly, the driving sprockets 331 and 331a vertically move the automated stacker unit 300 while accurately vertically moving without separating from the fixed chain 340, and remove the lateral load applied to the vertical post 202, thereby preventing the vertical post 202 from bending, so it is possible to reduce the size of the vertical post 202.

Figure 10:
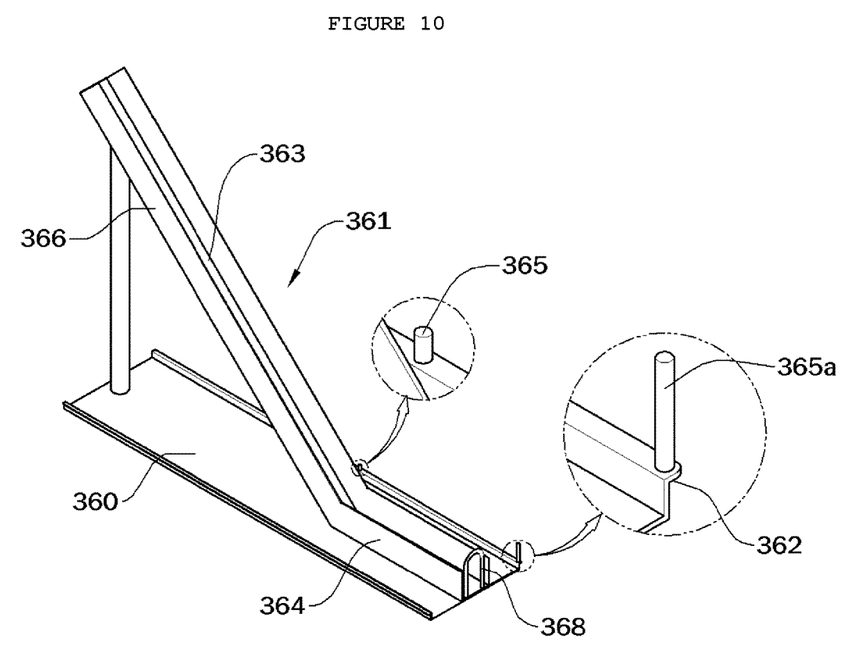
FIG. 10 is a perspective view of an article tray of the present invention.

On the other hand, the article tray 360 of the present invention has an inclining base 361, as shown in FIG. 10, to support a long article at an angle.

The inclining base 361 is integrally disposed in a longitudinal direction at the center of the top of the article tray 360 and has a horizontal portion 364 integrated with the top of the article tray 360 and an inclined portion 366 extending at an angle from an end of the horizontal portion 364. Further, an article support groove 363 may be recessed on the tops of the inclined portion 366 and the horizontal portion 364 to support an article W and may have various shapes in consideration of the shapes of articles W to be kept.

An anti-pushing step 368 that prevents an article disposed at an angle from being pushed back additionally protrudes at an end of the top of the horizontal portion 364, so articles W can be fixed without being pushed back.

Accordingly, the inclining base 361 having the horizontal portion 364 and the inclined portion 366 allows articles W kept as in FIG. 2 and articles to be stored and delivered to be alternately carried, when articles having a length over the half (1.5 m) of a container are kept.

Accordingly, it is possible to improve spatial usability, efficiently corresponding to the entire width of the warehouse 100.

Further, according to the present invention, since a configuration for supporting an article at an angle is provided, the front-rear width of the warehouse 100 is reduced, so it is possible to avoid violation of the Road Traffic Act when transporting the warehouse 100 to another place. Further, it is possible to ensure a sufficient height for preventing collision of articles W when lifting articles W supported at an angle and loading them on two floors, and it is also possible to temporarily reduce the height to prevent violation of the Road Traffic Act when transporting the warehouse 100.

Figure 14:
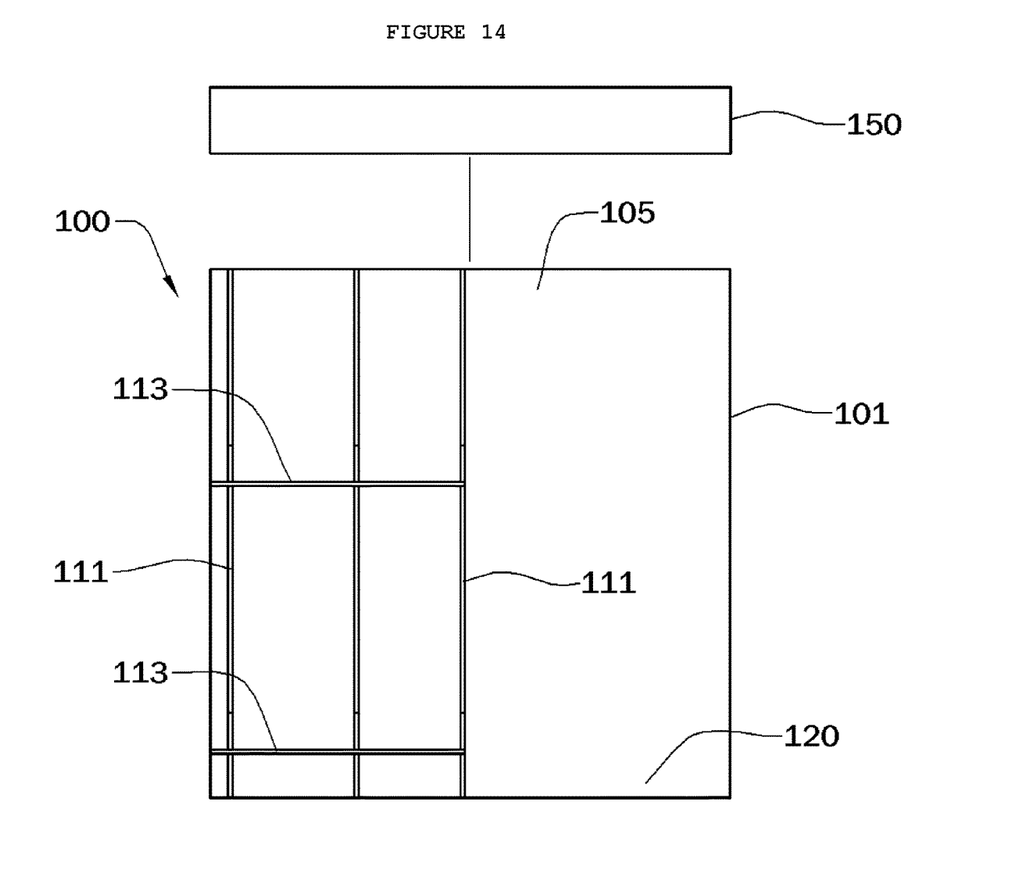
FIG. 14 is a side cross-sectional view showing a state when a height extension cover of the present invention is combined.

To this end, the warehouse 100 has an opening 105 at the top in order to maintain a height similar to the sizes of common containers and ensure a sufficient height for preventing collision of articles when lifting and loading articles W supported at an angle, and a height extension cover 150 for closing the opening 105 and ensuring a sufficient height to prevent collision of articles W disposed at an angle is assembled after the warehouse 100 is transported to a desired place.

That is, the warehouse 100 is manufactured at a factory as a finished product without the height extension cover 150 to have a height that does not violate the Road Traffic Act, so it is possible to load the warehouse 100 on a truck and transport it to desired places without being limited by traffic laws. Further, when the warehouse 100 is placed on the ground, the height extension cover 150 that is separately manufactured is fastened to the top of the opening 105 by fasteners 151, so an insufficient height is simply ensured, whereby it is possible to load articles on two floors and improve loading efficiency.

To this end, fastening holes 153 are formed though a front plate 101 and a rear plate 104 close to the opening 105 of the warehouse 100, and front and rear sides of the height extension cover 150 and the fastening holes 153 are fastened by the fasteners 151 with the front and rear sides of the height extension cover 150 in contact with the front plate 101 and the rear plate 104.

The automated stacker unit 300 has a tray entrance 400 for automatically putting the article tray 360 between the loading racks 110 or taking out the article tray 360.

Figure 9:
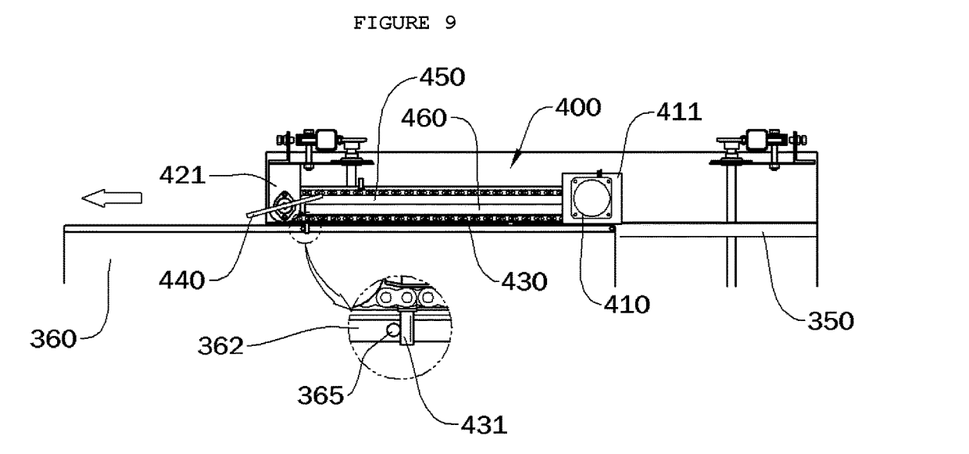
FIG. 9 is a horizontal cross-sectional view of a tray driving unit of the present invention.

According to the configuration of the tray entrance 400, a tray motor 410 is erected on a motor bracket 411 disposed at the rear upper portion of the base plate 310, a chain shaft bracket 421 spaced from the tray motor 410 is disposed on the base plate 310, and a tray carrying chain 430 is disposed on a chain shaft 420 rotatably disposed on the chain shaft bracket 421 and a motor shaft of the tray motor 410.

Figure 11:
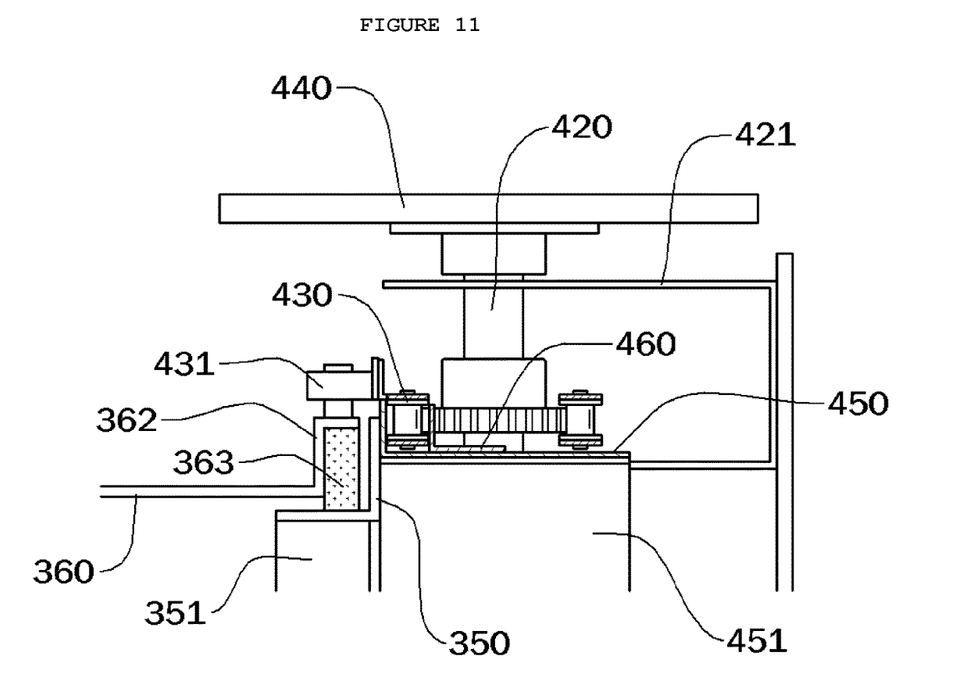
FIG. 11 is a side cross-sectional view showing combination of a drawing unit for carrying a tray and an article tray of the present invention.
Figure 12:
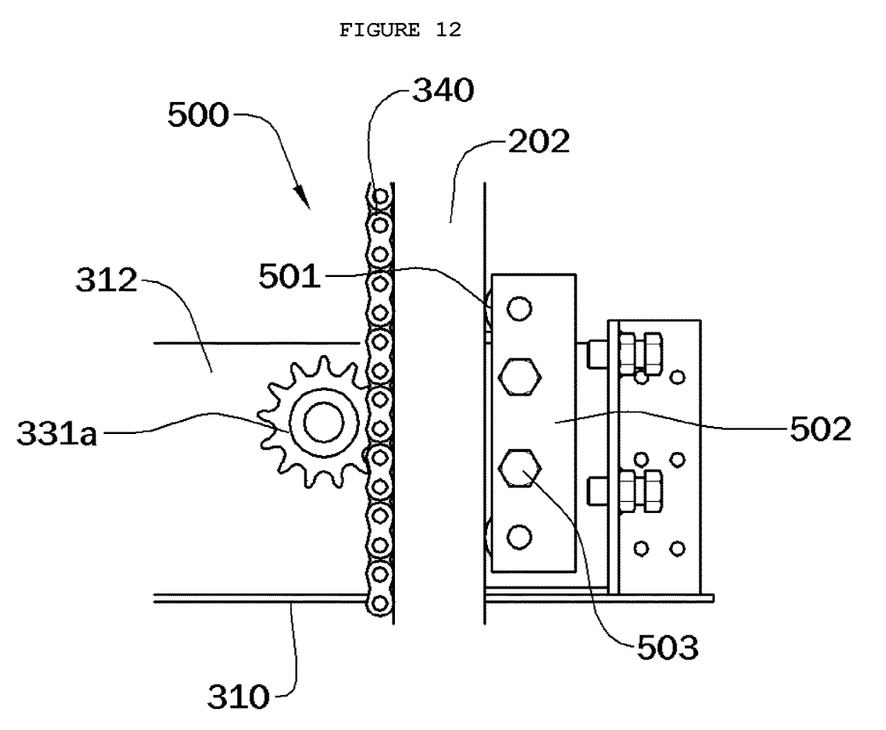
FIG. 12 is a front cross-sectional view of a vertical motion guide of the present invention.
Figure 13:
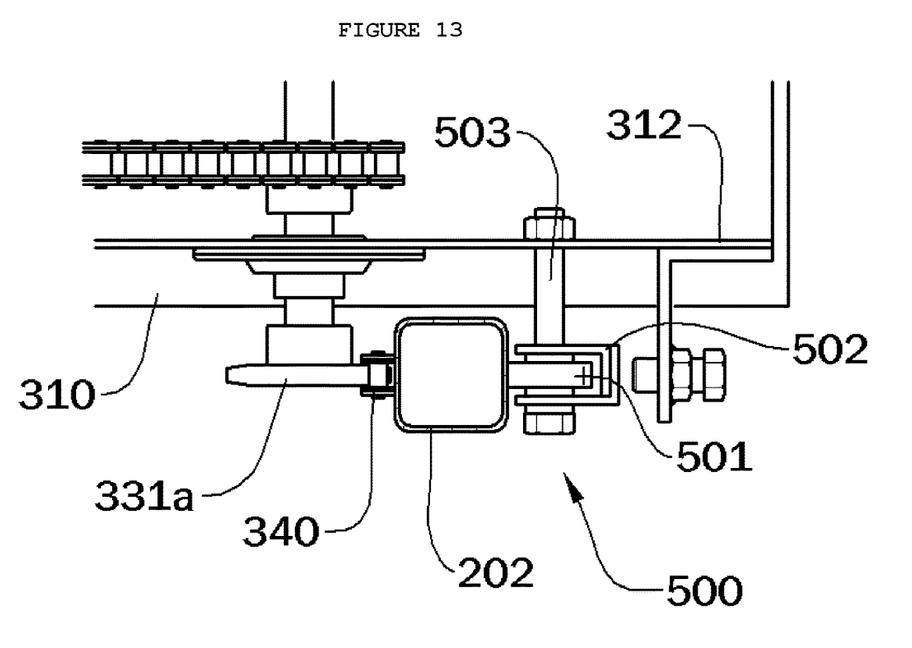
FIG. 13 is a horizontal cross-sectional view of the vertical motion guide of the present invention.

Further, the tray carrying chain 430 is rotatably disposed in parallel with a tray guide rail 350 and a pair of drawing units 431 attached to the tray carrying chain 430 selectively draws a pair of locking protrusions 365 and 365a attached to the upper end of the anti-bending portion 362 of the article tray 360, whereby the article tray 360 can be put inside between the loading racks 110 or the article tray 360 loaded on the loading rails 113 can be simply taken out.

The locking protrusions 365 and 365a are not formed at the same height, that is, one locking protrusion 365a of the pair of locking protrusions 365 and 365a may be formed higher than the other locking protrusion 365, whereby the higher locking protrusion 365a provides a specific effect that while the article tray 360 loaded on the loading racks 110 is taken out, the higher locking protrusion 365a is locked to a drawing bar 440 attached to the upper end of the chain shaft 420 rotatably supporting the tray carrying chain 430 when the drawing bar 440 is rotated, thereby automatically pulling the article tray 360 seated on the loading rails 113 so that the article tray can be automatically drawn out.

Accordingly, the article tray 360 can be moved and kept with an article W in pairs on the loading racks 110.

Further, the an anti-chain sagging base 450 that prevents sagging is disposed under the tray carrying chain 430 and is fixed to the upper end of a base 451 fixed to the base plate 310. A chain-straightening guide 460 is additionally disposed inside the tray carrying chain 430 and guides the tray carrying chain 430 so that the tray carrying chain 430 is straightly revolved. Accordingly, the drawing units 431 for smoothly drawing the locking protrusions 365 and 365a while moving straight are provided, so the article tray 360 can be smoothly stored and taken out.

The invention claimed is:

1. A height-extensible container-type warehouse, comprising:
   a warehouse having (a) a plurality of loading racks disposed along a lateral direction with a predetermined gap between adjacent loading racks, (b) a conveying line disposed ahead of the loading racks to convey an article in the lateral direction, and (c) an opening at a top of the warehouse and over the loading racks and the conveying line; and
   a height extension cover coupled to top of the warehouse to cover the opening and increase a height of the warehouse to prevent interference with an article positioned on the loading racks in a state of inclination,
   wherein,
      the warehouse has a front plate and a rear plate each with first fastening holes that extend though the front plate and the rear plate,
      front and rear sides of the height extension cover have second fastening holes that align with the first fastening holes,
      the height extension cover and the warehouse are secured together by fasteners extending through aligned first fastener holes and second fastener holes with the front and rear sides of the height extension cover in contact with the front plate and the rear plate, respectively,
      the conveying line includes one or more rails extending in the lateral direction and a frame carried on the rails along the lateral direction,
      the frame carries an article tray that can be loaded onto and unload from the frame in a longitudinal direction,
      an inclining base for supporting the article in the state of inclination at an angle in a longitudinal and vertical directions is disposed at a center of a top of an article tray,
      the article tray is moved laterally with the frame, and longitudinally relatively to the frame when loaded and unloaded, and kept paired with the article in the predetermined gap between the adjacent loading racks when unloaded from the frame,
      an automated stacker unit that (a) carries the article tray to desired positions with vertical movements and (b) automatically loads and unloads the article tray is disposed inside the frame, and
      the automated stacker unit includes a tray entrance for automatically transferring the article tray from the frame to between the adjacent loading racks or transferring the article tray from between the adjacent loading racks to the frame.

2. The height-extensible container-type warehouse of claim 1, wherein:
   the loading racks comprise parallel loading rails such that a loading rail from each of the adjacent loading racks is on opposite sides for the predetermined gap; and
   the article tray is received on the loading rails on the opposite sides of the predetermined gap.

3. The height-extensible container-type warehouse, wherein the article is a bicycle.

* * * * *